(12) United States Patent
Zhao et al.

(10) Patent No.: US 7,366,226 B2
(45) Date of Patent: Apr. 29, 2008

(54) PILOT CHANNEL TRACKING METHOD BASED ON MULTIPATH BARYCENTER TRACKING LOOP

(75) Inventors: Chunming Zhao, Jiangsu (CN); Jinghong Guo, Jiangsu (CN); Xiaohu You, Jiangsu (CN); Shixin Cheng, Jiangsu (CN)

(73) Assignees: The Research Institute of Telecommunication, Beijing (CN); Southeast University, Jiangsu (CN)

( * ) Notice: Subject to any disclaimer, the term of this patent is extended or adjusted under 35 U.S.C. 154(b) by 448 days.

(21) Appl. No.: 10/450,561
(22) PCT Filed: Dec. 12, 2001
(86) PCT No.: PCT/CN01/01617
§ 371 (c)(1),
(2), (4) Date: Oct. 17, 2003
(87) PCT Pub. No.: WO02/080423
PCT Pub. Date: Oct. 10, 2002

(65) Prior Publication Data
US 2004/0095957 A1    May 20, 2004

(30) Foreign Application Priority Data
Dec. 18, 2000    (CN) ............................... 00 1 28222

(51) Int. Cl.
*H04B 1/00* (2006.01)
(52) U.S. Cl. ............... 375/141; 370/320; 370/335; 370/342; 370/491; 375/130
(58) Field of Classification Search ............ 375/147, 375/150, 285, 354; 370/335, 342; 455/506; 708/309
See application file for complete search history.

(56) References Cited

U.S. PATENT DOCUMENTS
5,544,156 A     8/1996   Teder et al.
5,640,416 A  *  6/1997   Chalmers .................... 375/147

(Continued)

FOREIGN PATENT DOCUMENTS
CN         1147321 A       4/1997

(Continued)

OTHER PUBLICATIONS

Rives et al.; An Algorithm for Isolated Object Location in Digital Images, May 1982, ICASSP 1982, pp. 1924-1927.*

*Primary Examiner*—David C. Payne
*Assistant Examiner*—Adolf DSouza
(74) *Attorney, Agent, or Firm*—Browdy and Neimark

(57) ABSTRACT

The present invention discloses a method for pilot channel tracking based on multipath channel barycenter tracking loop, comprises steps of evaluating multipath fading channel parameters, calculating the barycenter of a multipath energy window, and loop filtering and adjusting the phase of spread spectrum sequence codes. The method of the invention does not need to individually track each delay path, thereby improving the tracking performance and timing recovery stability of a spread spectrum receiver. Only a multipath channel evaluator and a multipath energy window barycenter calculating means are used to track PN signals from a plurality of signal sources, thereby reducing hardware. Thus, a novelty coherent spread spectrum receiver can be constituted by cooperating with other parts.

3 Claims, 1 Drawing Sheet

U.S. PATENT DOCUMENTS

| | | | | |
|---|---|---|---|---|
| 5,943,331 A | * | 8/1999 | Lavean | 370/335 |
| 6,085,104 A | * | 7/2000 | Kowalski et al. | 455/506 |
| 6,108,324 A | * | 8/2000 | Brown et al. | 370/335 |
| 6,154,487 A | * | 11/2000 | Murai et al. | 375/150 |

FOREIGN PATENT DOCUMENTS

| | | | |
|---|---|---|---|
| EP | 99308682.6 | | 5/2000 |
| EP | 1039463 | * | 9/2000 |
| WO | WO 96/31959 | | 10/1996 |

\* cited by examiner

PILOT CHANNEL TRACKING METHOD BASED ON MULTIPATH BARYCENTER TRACKING LOOP

FIELD OF THE INVENTION

The present invention relates to a CDMA (code division multiple access) cellular communication system, more specifically, to a method for pilot channel tracking based on multipath channel barycenter tracking loop.

BACKGROUND OF THE INVENTION

CDMA cellular communication technique shows great potential for its features associated with large capacity, simple frequency planning, good communication quality and small electromagnetic interference. CDMA spread spectrum receivers are classified into coherent receivers and non-coherent receivers. Coherent receivers need the phase information of received signals, and non-coherent receivers do not need the phase information, but need the transmitted signal in quadrature modulating. The present invention pertains to coherent receiving mode in future CDMA cellular communication systems.

Multipath fading which causes serious multipath interference exists in a mobile communication system. In general, it is necessary to receive pilot signals with confirmation information so as to evaluate the amplitude and phase information of multipath signals so that it is possible to achieve multipath diversity and coherent reception. A coherent spread spectrum receiver which performs diversity processing is referred to as RAKE coherent receiver. RAKE coherent receivers can correct phases of a plurality of singlepath signals which carry same information and are independent from one another in fading features, and perform maximal combination to overcome multipath fading and improve received signal-to-interference ratio.

To achieve RAKE reception function, Synchronizing local spread spectrum sequence (PN code) with received signal is necessary. The synchronization is achieved by acquiring and tracking steps. The acquiring step acquires a pilot channel and confirms that initial synchronization (coarse synchronization) of PN code is complete. The tracking step finely synchronizes the PN codes by tracking pilot signals. The combination of these two steps provides PN code and accurate local timing required for a RAKE receiver.

Conventional PN code tracking method is based on so-called "early-late-gate" technique which finely adjusts phase of local PN code by observing and comparing the average energy in lead timing and lag timing of current pilot signals so as to finely synchronize PN codes. In the case where multipath arrival signals exist, effective arrival signals from each of paths are subjected to "early-late-gate" processing to achieve fine synchronization to multipath signals. Unfortunately, random changes in both the amplitude and phase of the arrival signals from each of the paths occur in a large range due to the serious fading in mobile communication systems. The tracking procedure for signals from each of the paths became extremely unstable as the fading of the signals if conventional "early-late-gate" technique is used. Further, the local timing for a receiver is generally established based on the signals from the earliest effective arrival path. Therefore, the establishment of local timing for a receiver lacks stability because the signals from the earliest effective arrival path are extremely unstable.

SUMMARY OF THE INVENTION

It is therefore an object of the present invention to provide a method for pilot channel tracking based on multipath channel barycenter tracking loop. The present invention provides a concept of multipath energy window and algorithms for calculating the barycenter of energy window to establish the method for pilot channel tracking based on multipath channel barycenter tracking loop, thereby overcoming degradation of the tracking performance for multipath signal and the non-determinacy of recovering local timing signals due to the early-late-gate processing method.

To achieve above object, it provides a method for pilot channel tracking based on multipath channel barycenter tracking loop comprising steps:

evaluating multipath fading channel parameters;

calculating the barycenter of a multipath energy window; and loop filtering and adjusting phase of spread spectrum sequence codes.

According to this invention, it is not necessary to individually track each delay path, and the tracking performance and stability of recovering timing for a spread spectrum receiver are therefore improved. For tracking pilot signals transmitted from a plurality of signal sources, it needs only a multipath signal evaluator and a multipath energy window barycenter calculating circuit in a manner of time division multiplexing, and hardware for the receiver is reduced. A novelty coherent spread spectrum receiver can be constituted by cooperating with other parts.

BRIEF DESCRIPTION OF THE DRAWINGS

The above and other objects, features, and advantages of the present invention will become apparent from the following description with reference to the accompanying drawings, which illustrate examples of the present invention.

DETAILED DESCRIPTION OF THE PREFERRED EMBODIMENTS

Figure 1:
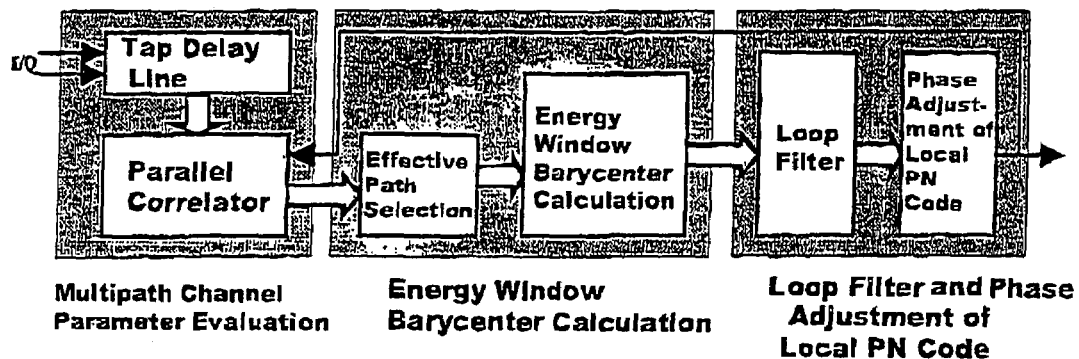
FIG. 1 schematically illustrates a flowchart of the method according to an embodiment of the invention.

Referring now to the accompanying drawings, there are shown preferred embodiments of the method for pilot channel tracking based on multipath channel barycenter tracking loop according to the invention.

This invention provides a method for pilot channel tracking based on multipath channel barycenter tracking loop. This method bases on following facts: the energy window and barycenter position of multipath signals are relatively stable, although the amplitude and phase of arrival signals from each path change randomly. The PN code tracking method according to the invention is capable of overcoming the non-determinacy of system timing and PN code tracking characteristic due to the early-late-gate processing for singlepath signals by adjusting the local PN code, determining the local timing for the coherent receiver, and selecting effective multipath within the energy window based on the change of barycenter position of the multipath energy window. The stability of the coherent spread spectrum receiver can be improved. This invention also provides a parallel processing method for the multipath energy window so that the achievement of the functions which track pilot signals, recover local timing, coherently combine RAKE diversity, AFC and search a plurality of cells is possible.

The method according to the present invention comprises steps:

1. Evaluating Multipath Fading Channel Parameters

A pilot channel in a CDMA system is used for transferring a pilot sequence known in advance which may provide a system timing, extract carriers, evaluate channels, and execute hand-off, etc. An equivalent baseband receiving signals may be expressed as equation (1) when the system simultaneously transmits signals through a plurality of channels, $$r(t) = \sum_n c_n \cdot \sum_i d_i s_i(t - n/W) + z(t) \quad (1)$$

wherein $d_i$ and $s_i(t)$ represent the signs and equivalent baseband signals transmitted through ith code division channel in downstream channels. The term of i=0 corresponds to the pilot channel. In general, it assumes that the sign transmitted by a pilot channel is $d_0$=0, $1/W=T_c$ is the time width of one chip, z(t) is complex White Gaussian noise of zero average value, $c_n$ is a fading factor of nth path of the channels. The purpose for evaluating channel parameter is to evaluate channel fading factor $c_n$ based on the received signals r(t) and the known pilot sequence $s_0(t)$.

It is assumed that a frequency selectivity slow fading channel model is used as a mobile channel, $c_n$ is then approximate to a constant within the channel evaluation region. The evaluation value of $c_n$ is given as follow:

$$\overline{c}_n = \frac{1}{NE_o} \int_0^{NT_c} r(t + nT_c) \cdot s_0^*(t) dt = c_n + N_a + N_c + N_z \quad (2)$$

wherein $N_a$, $N_c$, and $N_z$ are the outputs caused by multipath interference, multiple access interference and white noise passed through a correlator due to the non-ideal correlation characteristic, $T_c$ is a time width of one chip, $NT_c$ is an integration region of a channel evaluation, and $E_c$ is energy transmitted through a pilot channel within one chip.

2. Multipath Energy Window and Barycenter Calculation thereof

The effective distribution range of channel fading factor $c_n$ in equation (1) is defined as multipath signal energy distribution window (hereinafter is referred to as multipath energy window), The size of the window may be determined by time-delay extend range of multipath channels. For the sake of simplifying discussion, the effective distribution range of $c_n$ may be set to $n \in [-L_1, L_2]$. The size of the window in multipath fading circumstances may be set differently for different areas, for example, 3 μs for cities, 6 μs for countries, and 15 μs for mountain areas. The size of window is associated with circumstance where the cellular communication system is located, and is regardless of the used frequency band. The size of multipath energy window may be selected according to the maximal possible value, for example, no more than 30 μs, and then the value of L=$L_2$-$L_1$+1 is not more than 30 μs/$T_c$, so that a spreading receiver can be used in various circumstances.

In multipath energy window, not all signal arrival paths are effective. To this end, a threshold may be set to judge the signal energy (i.e., intensity of $c_n$) for each of paths in a window. A signal arrival path is judged as effective path when the signal energy is larger than the threshold. Otherwise, the path is judged as a pure interference path. To avoid the degradation of the performance, the calculation is not applied to all pure interference paths. The threshold is set slightly larger than the side lobe value of a pilot signal (PN code) partial correlation value.

If K denotes the evaluated result of kth channel, the barycenter of corresponding multipath energy window is given by cg(k)=$cg_w(k)/cg_s(k)$, wherein $cg_w(k)$ and $cg_s(k)$ are calculated as follows:

$$cg_w(k) = \sum_n n|\overline{c_n}(k)|^2, \; cg_s(k) = \sum_n n|\overline{c_n}(k)|^2 \quad (3)$$

wherein n corresponds to the position where the multipath fading factor $c_n(k)$ locates in multipath energy window. It should be noted that each of $\overline{c_n}(k)$s to be operated in equation (3) is effective signal arrival path which is large than designated threshold.

3. Loop Filter and Phase Adjustment of Local PN Code

PN code tracking loop for multipath energy window barycenter is designed such that the target position of multipath energy window barycenter is set to $cg_{target}$ so that the PN code phase of the receiver can be adjusted by detecting the difference between the multipath energy window barycenter value cg(k) and $cg_{target}$ to reduce the difference. For simplifying the calculation, it is assumed that $cg_{target}$ is set to zero, the phase adjustment of local PN code can be then performed by simply judging the polarity of $cg_w(k)$, but there is no need to calculate $cg_s(k)$ and cg(k).

To avoid incorrect adjustment due to the random changes of multipath fading signals and channel evaluation errors, the barycenter evaluating value calculated by equation (3) is smoothly filtered. Assuming the smoothly filtered evaluating value is $\overline{cg_w(k)}$, the adjusting operation can be generalized to:

let the phase of local PN code lead δ if $\overline{cg_w(k)}$>0 let the phase of local PN code lag δ if $\overline{cg_w(k)}$<0 let the phase of local PN code hold if $\overline{cg_w(k)}$=0 \quad (4)

An embodiment of the invention is described with reference to the accompanying drawings.

As described above, the method for pilot channel tracking based on multipath channel barycenter tracking loop comprises evaluating multipath channel, calculating the barycenter of the energy window and loop filtering, and adjusting the phase of PN code. FIG. 1 shows a block diagram of a multipath energy window pilot tracking. The configuration and the functions of each of parts in FIG. 1 are discussed as follows.

Multipath channel evaluating unit comprises a tap delay line unit and a parallel correlator. The tap delay line unit receives baseband sampling signals. The sampling interval may be set to $T_c/M$, and M may be set to, for example, 2, 4, or 8 as desired. The parallel correlator is controlled by an external timing to calculate all multipath channel fading parameters $\overline{c_n}(N)$ within the multipath energy window, and the obtained result is processed in a multipath energy window barycenter calculating means.

The multipath energy window barycenter calculating means comprises an effective path selecting unit and a multipath energy window barycenter calculating unit. The effective path selecting unit receives the multipath channel evaluating output from previous stage and judges whether $\overline{c_n}(k)$ is larger than the threshold so as to determine whether the received signals are from effective arrival paths. It should be noted that the threshold is set slightly larger than the side lobe value of a pilot signal (PN code) partial correlation value. A $\overline{c_n}(k)$ is set to zero if the amplitude of $\overline{c_n}(k)$ is smaller than set threshold. The multipath energy window barycenter calculating unit performs equation (3) to calculate $cg_w(k)$. The calculated result is provided to a loop filter unit.

With regard to loop filter and phase adjustment of local PN code, a loop filter unit lowpass filters $cg_w(k)$ to obtain $\overline{cg_w(k)}$ value required for PN code phase adjustment. The lowpass filter may select following one order lowpass filter, $$\overline{cg_w(k)} = \alpha \overline{cg_w(k-1)} + cg_w(k) \quad (5)$$

or select slide window average method to perform lowpass filter, $$\overline{cg_w(k)} = \sum_{l=0}^{j-1} cg_w(k-l) \quad (6)$$

The selection of lowpass filter parameters α and J is dependent upon concrete requirements such that the cut-off frequency of the lowpass filter is larger than the absolute error value of the local PN code. The output $\overline{cg_w(k)}$ from the loop filter unit is supplied to a local PN code phase adjusting unit to adjust the phase of the PN code.

Figure 2:
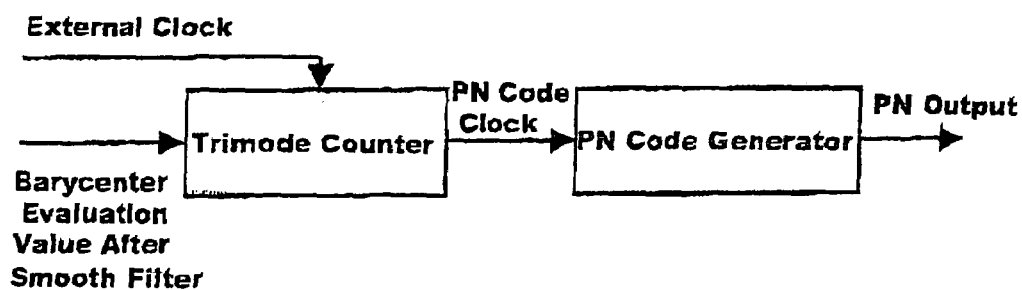
FIG. 2 schematically illustrates a block diagram of PN code phase adjustment according to an embodiment of the invention.

The local PN code phase adjusting unit performs the operation shown in equation (3). According to an embodiment of the present invention, the local PN code phase adjustment is executed by finely adjusting the transmitting clock of local PN code. FIG. 2 illustrates an operation flowchart of the method according to the invention. In FIG. 2, the PN code clock is generated by counting the frequency division of a multiple times (M times) external clock. A variable mode counter finely adjusts the chip clock. The mode value of the counter is M−1 if the $\overline{cg_w(k)}$ is positive. The mode value is M+1 if the $\overline{cg_w(k)}$ is negative. Otherwise, the mode value of the counter is M. In this way, the PN code phase can be adjusted, and the phase difference of fine adjustment is δ=$T_c$/M, wherein M may be 32 or 64 to ensure the adjustment accuracy enough.

Figure 3:
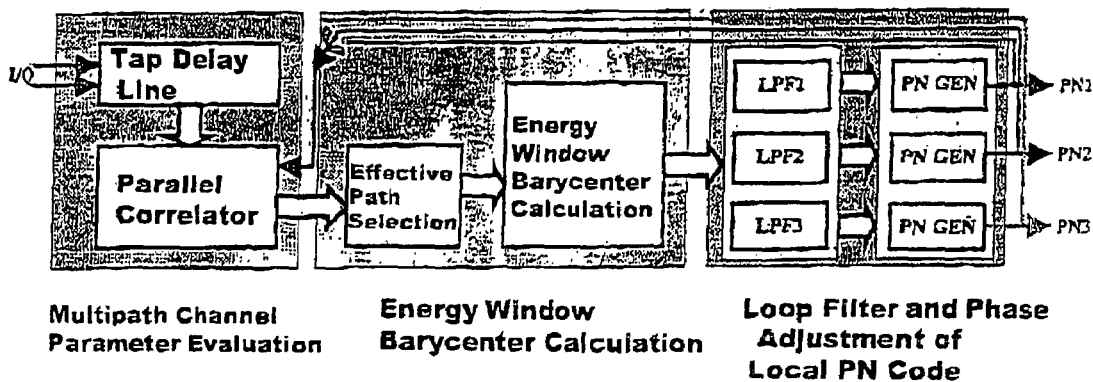
FIG. 3 schematically illustrates a block diagram of a multipath energy window barycenter tracking loop which is suitable for a plurality of signal transmitting sources.

In practice, it is possible to simultaneously track pilot signals transmitted from a plurality of signal sources. For example, a mobile station executes macro-diversity on the signals transmitted from a plurality of base stations. The pilot signals from each of the signal sources are tracked respectively since the paths arriving at a receiving terminal from each of signal sources are independent from one another. The barycenter of multipath energy window from a plurality of signal sources can be calculated in time division multiplexing manner and the pilot signals from each of signal sources can be tracked respectively since the multipath energy window barycenter changes slowly. FIG. 3 shows a schematic diagram of tracking pilot signals from a plurality of signal sources. The multipath channel evaluating unit and the multipath energy window barycenter calculating unit may operate in time division multiplexing manner for reducing hardware. The loop filter and PN code phase adjusting unit may operate independently from each other in parallel.

EXAMPLE

Next, the implement of the present invention is described with a mobile terminal in CDMA 2000-1x system used as an example. The mobile terminal may be a vehicle mobile station in CDMA2000-1x cellular mobile communication system fitting Standard 3GPP2 Release A. The pilot channel synchronizing and tracking parts can be implemented by, for example, a XC4085xla FPGA chip, a product of Xilinx company. The main parameters are listed as follows:

Spreading chip rate is 1.2288 MHz;
I/O sampling rate is 4×1.2288 MHz, 6 bits input;
Multipath energy window parameters are set to L=32, $L_1$=12, $L_2$=19;
Loop filtering uses slide window average manner, parameter J is set to 16;
External clock (EXT_CLK) is 39.3216 MHz;
Integrating period for channel evaluating is 384 chip intervals (N=384);
Correlator bank uses a 16-times time division multiplexing manner;
Each of physical correlators may execute 15 banks of effective correlation operation.

The pilot tracking loop for multipath energy window barycenter can provide excellent stability in the circumstances of vehicle mobile terminals.

Although embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A method for pilot channel tracking based on multipath channel barycenter tracking loop comprising:
    evaluating multipath fading channel parameters;
    calculating the barycenter evaluating value of a multipath energy window; and
    smoothly filtering the calculated barycenter evaluating value and adjusting the phase of spread spectrum sequence codes based on the filtered barycenter evaluating value,
    wherein the barycenter evaluating value of the multipath energy window from a plurality of signal sources is calculated in a manner of time division multiplexing, and PN signals from each of signal sources is tracked respectively.

2. The method for pilot channel tracking based on multipath channel barycenter tracking loop according to claim 1, wherein the step of evaluating multipath fading channel parameters is executed by a tap delay line unit and a parallel correlator, wherein the tap delay line unit receives baseband sampling signals whose interval is $T_c$/M, and the parallel correlator calculates fading parameters $\overline{c_n}(k)$ of all multipath channels within the multipath energy window under the control of an external clock,
    the step of calculating the barycenter evaluating value of the multipath energy window is executed by an effective paths selecting unit and an multipath energy window barycenter calculating unit, wherein the effective paths selecting unit receives the evaluating output results of multipath channels in previous stage and comparing the $\overline{c_n}(k)$ with a threshold, and the multipath energy window barycenter calculating unit calculates $cg_w(k)$ with the equation $$cg_w(k) = \sum_n n|\overline{c_n}(k)|^2,$$

the step of filtering and adjusting phase of spread spectrum sequence codes is executed by a loop filter unit and a local spread spectrum sequence phase adjusting unit, wherein the loop filter unit filters the $cg_w(k)$, and the local spread spectrum sequence phase adjusting unit finely adjusts a local spread spectrum sequence clock to adjust the phase of the local PN code.

3. The method for pilot channel tracking based on multipath channel barycenter tracking loop according to claim 2, wherein the step of adjusting the phase of the local spread spectrum sequence is executed by finely adjusting the local spread spectrum sequence clock, wherein the local spread spectrum sequence clock is generated by counting the frequency division of a multiple times (M times) external clock, a variable mode counter finely adjusts a chip clock.

* * * * *